Oct. 31, 1933.   W. WILDERMUTH   1,932,651
APPARATUS FOR PRODUCING SHEET GLASS
Filed April 8, 1931
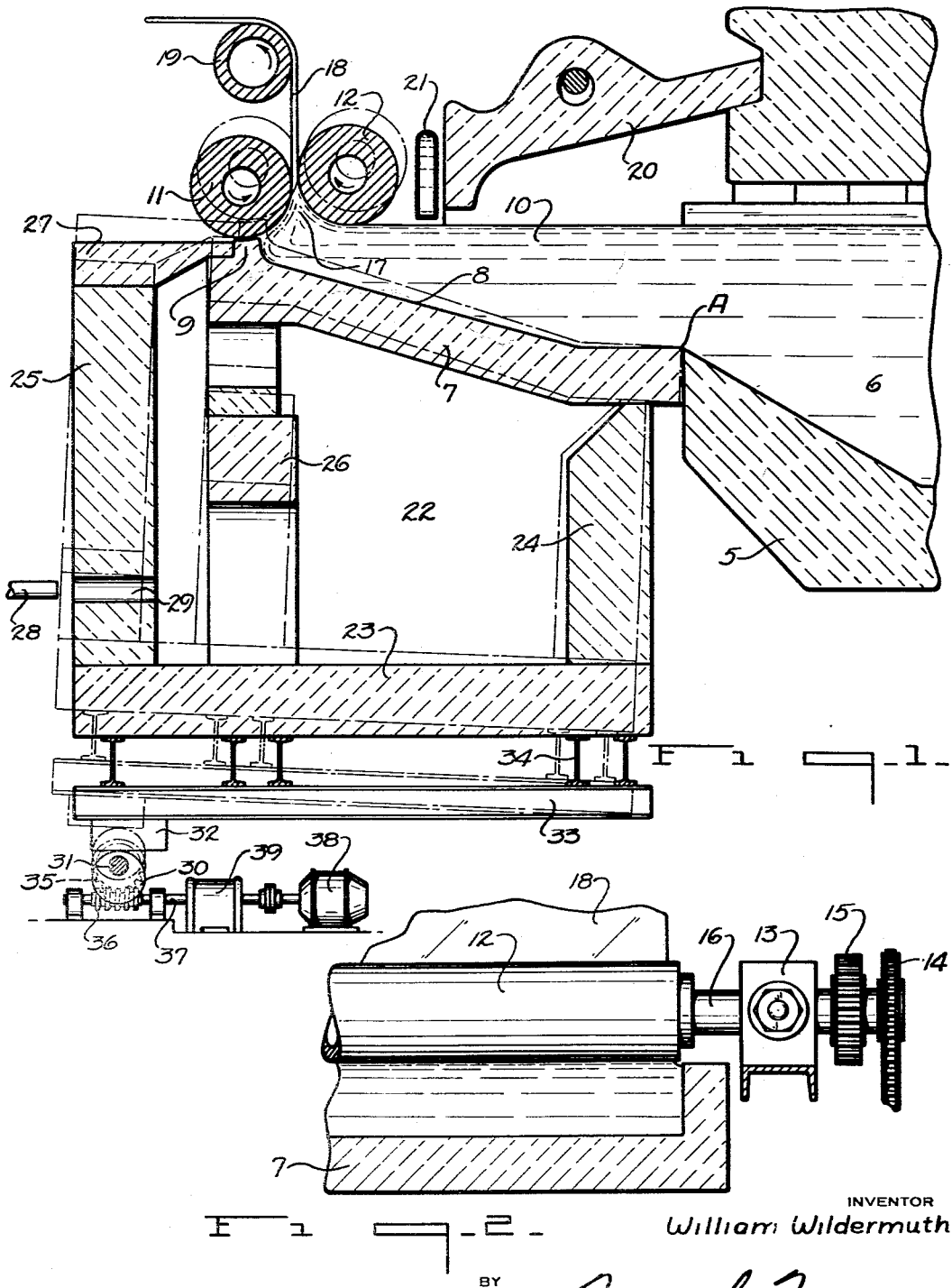
INVENTOR
William Wildermuth
BY
Frank Fraser
ATTORNEY Patented Oct. 31, 1933

1,932,651

UNITED STATES PATENT OFFICE 1,932,651

APPARATUS FOR PRODUCING SHEET GLASS

William Wildermuth, Lancaster, Ohio, assignor to Libbey-Owens-Ford Glass Company, Toledo, Ohio, a corporation of Ohio Application April 8, 1931. Serial No. 528,487

5 Claims. (Cl. 49—33)

The present invention relates broadly to apparatus for producing sheet glass and more particularly to a sheet glass rolling machine.

In the production of ground and polished glass, usually called plate glass, it is desirable that the plate glass blanks be of a uniform thickness and perfectly flat since the flatter and more uniform the thickness of a plate glass blank, the less amount of time is required to grind the same preparatory to polishing. Obviously, the shorter the time required for grinding, the smaller will be the cost of the finished plate. Also, when the blank is flat and of a uniform thickness, it is possible to start the grinding operation with a thinner blank than if it were not flat or uniform in thickness.

According to this invention, the rolling machine herein provided consists briefly of a pair of forming rolls positioned in relatively close proximity to a bath of molten glass contained within a working receptacle, said rolls being associated with one another to create a sheet forming pass therebetween and being adapted upon rotation thereof to draw a relatively heavy body of molten glass upwardly from said bath and reduce it to sheet form.

An important object of the present invention resides in the provision of a rolling machine capable of continuously producing a flat sheet of substantially predetermined thickness which is uniform throughout and which is therefore particularly well adapted for use as a plate glass blank.

Another important object of the invention resides in the positioning of the forming rolls with respect to the bath of molten glass in a novel manner whereby a sufficient supply of glass to the sheet forming pass is at all times assured so that an actual rolling of the glass to sheet form may be achieved.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through sheet glass apparatus provided by the present invention, and Fig. 2 is a transverse section through a portion thereof.

Referring now to the drawing, 5 designates a portion of a continuous tank furnace or the like in which a mass of molten glass 6 is adapted to be properly melted and refined. Associated with the forward end of the furnace 5 and adapted to receive the molten glass therefrom is a working receptacle 7, the bottom 8 of which inclines upwardly from the furnace to the closed end 9 thereof. When the machine is in operation, the closed end 9 of the working receptacle 7 is disposed slightly beneath the level of the molten glass 10 within the said receptacle as clearly indicated by the full lines in Fig. 1.

Associated with the forward end of the working receptacle 7 are the sheet forming rolls 11 and 12, said rolls being preferably horizontally disposed with respect to one another and spaced to create a sheet forming pass therebetween. The forming roll 11 is positioned directly above the closed end 9 of the working receptacle and closely adjacent thereto so that the lower portion of the roll is also beneath the level of the bath of molten glass 10. On the other hand, the forming roll 12 is arranged above the bath of molten glass at substantially the surface thereof although its vertical position may be varied as desired. The forming rolls 11 and 12 are preferably internally cooled by circulating a suitable cooling medium therethrough, and are mounted at each end within a supporting bearing bracket 13. The rolls are also preferably yieldably urged toward one another so that they can freely move apart to permit the passage of stones or other foreign matter therebetween. One of the forming rolls may be positively driven as through a chain drive 14 and the other roll driven from the first roll through intermeshing gears 15 carried by the roll shafts 16.

In operation, the forming rolls 11 and 12, positioned as shown by the full lines in Fig. 1, are adapted to be driven in the directions indicated by the arrows so that they will function to draw a relatively heavy body of glass 17 upwardly from the molten bath 10 and reduce it to a sheet 18 of substantially predetermined and uniform thickness. The sheet 18 is here shown as being continued upwardly for a relatively short distance and then deflected about a bending member or roll 19 into the horizontal plane, in which plane it is carried forwardly into and through an annealing leer (not shown). However, it will be apparent that the sheet can be deflected directly about the forming roll 11 if desired and the roll 19 omitted. The working receptacle 7 is continuously supplied with properly melted and conditioned molten glass from the furnace 5 and, due to the novel positioning of the forming rolls 11 and 12 with respect to the molten bath 10, a sufficient amount of glass will at all times be supplied to the sheet forming pass between the rolls in order to permit an actual rolling thereof so that the production of a constant uniform, flat and smooth sheet of glass may be assured. When the machine is in operation, the forming roll 11 cooperates with the closed end 9 of the working receptacle to prevent the molten glass from flowing therefrom.

In order to facilitate the conditioning of the molten glass in the working receptacle and to also protect the forming roll 12 and sheet being formed from heated gases issuing from the furnace, there is arranged above the working receptacle a lip tile 20, and positioned in advance of the said lip tile is a water cooler 21.

The working receptacle 7 is arranged above a heating chamber 22 including a bottom 23 and the side walls 24 and 25. The working receptacle is supported at one end upon the wall 24 and at its opposite end upon stools 26 positioned inwardly of and spaced from the front wall 25 of the heating chamber. A horizontal cover tile 27 is supported upon the upper end of wall 25 and the adjacent end of working receptacle 7. The heating chamber 22 may be heated by means of burners or the like 28 which direct the heating flames through openings 29 in the wall 25.

As set forth above, when the rolling machine is in operation, the closed end 9 of the working receptacle is positioned beneath the level of the bath of molten glass 10. With such an arrangement, however, when the forming roll 11 is raised upwardly for any purpose or removed from the machine, the molten glass will flow from the receptacle over the closed end thereof, in the event some means is not provided to prevent such overflow. In order to prevent the overflow of glass from the receptacle upon raising or removal of the roll 11, the working receptacle 7 and heating chamber 22 are preferably movably mounted so that they may pivot as a unit about the point A whereby to move the closed end 9 of the working receptacle above the level of the molten glass therein as indicated by the broken lines in Fig. 1.

The means for raising and lowering the forward end of the working receptacle may take a variety of different forms but, as shown herein for the purpose of illustration, there is provided one or more eccentrics 30 carried upon a shaft 31 and adapted to engage a block 32 secured to the longitudinally extending beams 33 which are connected together by transverse beams 34 upon which the heating chamber is supported. Also keyed to the shaft 31 is a worm gear 35 meshing with a worm 36 carried upon shaft 37 which is driven from a motor 38 through suitable reduction gearing in casing 39. With such an arrangement, it will be readily apparent that in order to raise or lower the forward end of the working receptacle, it is simply necessary to effect the rotation of eccentric 30.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a bath of molten glass and having its forward end disposed beneath the normal level thereof, a pair of horizontally arranged forming rolls positioned in proximity to said bath and adapted to draw a relatively heavy body of glass upwardly therefrom and reduce it to sheet form, one of said forming rolls being positioned above the forward end of said receptacle, with the lower portion thereof also disposed beneath the level of the molten glass therein, and means for tilting said receptacle to raise or lower the forward end thereof.

2. In sheet glass apparatus, a receptacle containing a bath of molten glass and having its forward end disposed beneath the normal level thereof, a pair of horizontally arranged forming rolls positioned in proximity to said bath and adapted to draw a relatively heavy body of glass upwardly therefrom and reduce it to sheet form, one of said forming rolls being positioned above the forward end of said receptacle, with the lower portion thereof also disposed beneath the level of the molten glass therein, while the other forming roll is positioned above the bath of molten glass at substantially the surface thereof, and means for tilting said receptacle to raise or lower the forward end thereof.

3. In sheet glass apparatus, a receptacle containing a bath of molten glass and having its forward end disposed beneath the normal level thereof, a pair of horizontally arranged forming rolls positioned in proximity to said bath and adapted to draw a relatively heavy body of glass upwardly therefrom and reduce it to sheet form, one of said forming rolls being positioned above the forward end of said receptacle, with the lower portion thereof also disposed beneath the level of the molten glass therein, a heating chamber above which the said receptacle is supported, and means for tilting the receptacle and heating chamber as a unit to raise or lower the forward end of said receptacle.

4. In sheet glass apparatus, a receptacle containing a bath of molten glass and having its forward end disposed beneath the normal level thereof, a pair of horizontally arranged forming rolls positioned in proximity to said bath and adapted to draw a relatively heavy body of glass upwardly therefrom and reduce it to sheet form, one of said forming rolls being positioned above the forward end of said receptacle, with the lower portion thereof also disposed beneath the level of the molten glass therein, while the other forming roll is positioned above the bath of molten glass at substantially the surface thereof, a heating chamber above which the said receptacle is supported, and means for tilting the receptacle and heating chamber as a unit to raise or lower the forward end of said receptacle.

5. In sheet glass apparatus, a receptacle containing a bath of molten glass, a pair of horizontally arranged forming rolls positioned in proximity to said bath and adapted to draw a relatively heavy body of glass upwardly therefrom and reduce it to sheet form, and a bending roll located above the forming rolls and about which the sheet is deflected from the vertical into the horizontal plane, one of said forming rolls being positioned above the forward end of said receptacle, with the lower portion thereof disposed beneath the level of the molten glass therein, while the other forming roll is positioned in a relatively higher horizontal plane above and at substantially the surface of the bath of molten glass.

WILLIAM WILDERMUTH.